US012404702B1

(12) United States Patent
Kelsch et al.

(10) Patent No.: US 12,404,702 B1
(45) Date of Patent: Sep. 2, 2025

(54) ANTI-THEFT DEVICE HAVING AN ELECTROMECHANICALLY ACTUATED ARM

(71) Applicants: Vanguard Products Group, Inc., Oldsmar, FL (US); Christopher A. Kelsch, Palm Harbor, FL (US)

(72) Inventors: Christopher A. Kelsch, Palm Harbor, FL (US); Francesc Agustin, Clearwater, FL (US); Jasen Paul Biggins, Raleigh, NC (US); Lee Eckert, Sarasota, FL (US); John N. Figh, Jr., Tampa, FL (US); Wade Zhu, Land O' Lakes, FL (US)

(73) Assignee: Vanguard Products Group, Inc., Oldsmar, FL (US)

( * ) Notice: Subject to any disclaimer, the term of this patent is extended or adjusted under 35 U.S.C. 154(b) by 0 days.

(21) Appl. No.: 18/675,988

(22) Filed: May 28, 2024

Related U.S. Application Data

(63) Continuation of application No. 17/851,913, filed on Jun. 28, 2022, now Pat. No. 11,993,959, which is a (Continued)

(51) Int. Cl.

| | |
|---|---|
| ***E05B 73/00*** | (2006.01) |
| ***E05B 41/00*** | (2006.01) |
| ***E05B 47/00*** | (2006.01) |
| ***G07C 9/00*** | (2020.01) |
| ***G08B 13/14*** | (2006.01) |

(52) U.S. Cl.
CPC .......... *E05B 73/0082* (2013.01); *E05B 41/00* (2013.01); *E05B 47/0012* (2013.01); *G07C 9/00182* (2013.01); *G08B 13/1472* (2013.01); *E05B 2047/0016* (2013.01); *E05B 2047/0017* (2013.01)

(58) Field of Classification Search
CPC ...... E05B 73/00; E05B 41/00; E05B 47/0012; E05B 2047/0016; E05B 2047/0017; G07C 9/00182; G07B 13/1472
USPC .......................................................... 70/58–62
See application file for complete search history.

(56) References Cited

U.S. PATENT DOCUMENTS

| | | | | |
|---|---|---|---|---|
| 10,323,440 | B1 * | 6/2019 | Kelsch | G08B 13/2434 |
| 10,378,248 | B1 * | 8/2019 | Kelsch | E05B 35/008 |

(Continued)

*Primary Examiner* — Suzanne L Barrett
(74) *Attorney, Agent, or Firm* — Andriy Lytvyn; Hill Ward Henderson, P.A.

(57) ABSTRACT

An anti-theft device for securing an article of merchandise against unauthorized removal from a display counter. The anti-theft device includes a plurality of arms configured to immobilize the article of merchandise relative to a tray. At least one arm is operated by an electromechanical release mechanism between closed and opened positions. When the electromechanically actuated arm is in the closed position, the article of merchandise is immobilized relative to the tray. When the electromechanically actuated arm is transitioned into the open position, the article of merchandise can be removed from the tray. The anti-theft device may include a locking mechanism configured to transition between a locked configuration, in which the arms are immobilized relative to the tray, and an unlocked configuration, in which the arms can be extended or retracted relative to the tray.

20 Claims, 9 Drawing Sheets

Related U.S. Application Data continuation of application No. 17/545,542, filed on Dec. 8, 2021, now Pat. No. 11,401,738.

(60) Provisional application No. 63/153,506, filed on Feb. 25, 2021.

(56) References Cited

U.S. PATENT DOCUMENTS

| | | | | |
|---|---|---|---|---|
| 10,492,322 | B1 * | 11/2019 | Fan | H03K 17/96 |
| 10,858,865 | B2 * | 12/2020 | Kelsch | E05B 73/0017 |
| 11,401,738 | B1 * | 8/2022 | Kelsch | E05B 47/0012 |
| 11,993,959 | B2 * | 5/2024 | Kelsch | E05B 73/0082 |
| 2015/0300050 | A1 * | 10/2015 | Van Balen | B60R 11/0252<br>248/551 |
| 2016/0201359 | A1 * | 7/2016 | Berglund | G08B 13/1472<br>70/58 |

* cited by examiner

ANTI-THEFT DEVICE HAVING AN ELECTROMECHANICALLY ACTUATED ARM

PRIORITY CLAIM

This non-provisional patent application is a continuation of and claims priority to the U.S. Non-Provisional patent application Ser. No. 17/851,913 filed on Jun. 28, 2022, which is a continuation of and claims priority to the U.S. Non-Provisional patent application Ser. No. 17/545,542 filed on Dec. 8, 2021, which is a continuation of and claims priority to U.S. Provisional Patent Application No. 63/153,506 filed on Feb. 25, 2021.

BACKGROUND OF THE INVENTION

1. Field of the Invention

This invention relates to merchandise anti-theft devices. More specifically, it relates to an anti-theft device having an electromechanical release mechanism that selectively locks or releases an article of merchandise.

2. Brief Description of the Related Art

Retailers often prefer to present their merchandise to customers in a way that allows the customers to touch, inspect, and otherwise interact with the products at a display counter. Many merchandise items, especially portable electronic devices, are relatively expensive and, therefore, are under a serious threat of theft. Retailers often face a dilemma pertaining to how to interactively display their merchandise to attract customers and increase sales, while, at the same time, safeguarding the merchandise against theft.

Currently available anti-theft solutions generally involve obtrusive, bulky, heavy, and aesthetically unattractive devices such as brackets, steel cables, locks, and casings. Although these security measures may effectively protect against theft, they have a negative effect on the customer shopping experience by discouraging interaction with products and may ruin the overall ambiance of a retail store.

When a customer decides to go to a retail store to have a firsthand experience with an electronic gadget, that customer generally desires to preview the experience of owning the electronic gadget. However, most state-of-the-art anti-theft devices are not designed to provide the customer with a pure, unadulterated interaction with the electronic gadget. Unfortunately, because most anti-theft devices stay attached to the electronic gadget during the entirety of a customer interaction, these traditional anti-theft devices can diminish the quality of customer experience in multiple ways. First, when an anti-theft device is attached to an electronic gadget, the customer cannot feel the true weight of the electronic gadget. Second, traditional anti-theft devices make electronic gadgets appear much bulkier and less aesthetically pleasing. Third, anti-theft devices can ruin the ergonomics of the design. These flaws undermine engineering and marketing efforts that manufacturers of electronic gadgets undertake to make their devices slimmer, lighter, and more pleasing to handle.

Consequently, while it is crucial for retailers to protect their expensive merchandise against theft, the retailers may wish to enable trusted customers to interact with their merchandise in its pure form, unaltered by an attached anti-theft device. In such circumstances, retailers and their trusted customers would significantly benefit from an anti-theft device that can quickly release the secured merchandise. Furthermore, to avoid ruining the high-tech aesthetics of an electronic gadget by unlocking a lock to remove a bracket, it would be beneficial for the anti-theft device to operate via an electromechanical mechanism that seamlessly releases the secured electronic gadget in a visually appealing manner, commensurate with the high value of the electronic gadget being displayed.

Accordingly, there exists an unresolved need for an effective anti-theft device having an electromechanical release mechanism.

SUMMARY OF THE INVENTION

The unresolved need stated above is now met by a novel and non-obvious invention disclosed and claimed herein. In an embodiment, the invention pertains to an anti-theft device for securing an article of merchandise—for example, an electronic gadget such as a smartphone or a tablet. The anti-theft device has a pedestal configured to be affixed to a support surface. The pedestal has a tray, wherein the tray is configured to support the article of merchandise thereon. As used herein, the term "tray" refers to a surface on which the article of merchandise is positioned while secured by the anti-theft device. The tray may be a surface of the pedestal itself, or the tray can be a separate component configured to couple to the pedestal.

The anti-theft device has a plurality of arms configured to immobilize the article of merchandise relative to the tray. At least one of the arms is configured to be movable relative to the tray using an electromechanical actuation mechanism. This electromechanically actuated arm has a closed position in which the article of merchandise is immobilized relative to the tray. The electromechanically actuated arm also has an open position in which the article of merchandise can be removed from the tray.

The anti-theft device may further include a locking block movingly disposed within the pedestal. The locking block has a first position relative to the pedestal in which the locking block engages the electromechanically actuated arm to transition the electromechanically actuated arm into the closed position and immobilize it in that closed position. The locking block also has a second position relative to the pedestal in which the locking block releases the electromechanically actuated arm, allowing it to transition into the open position.

A motor is positioned within the pedestal and is operably connected to the locking block. The motor may be an electric motor, a pneumatic motor, or any other type of motor suitable for rotating a driving screw. For ease of reference, the exemplary embodiment described herein refers to an electric motor, but this description should not be interpreted as exclusionary of other motor types.

Actuation of the electric motor selectively moves the locking block between the first position and the second position. In this manner, selective actuation of the electric motor closes the electromechanically actuated arm to immobilize the article of merchandise relative to the tray or opens the electromechanically actuated arm to release the article of merchandise from the tray.

In an embodiment, the electric motor is operably connected to the locking block via a worm drive. The worm drive prevents the electromechanically actuated arm from being transitioned from the closed position into the open position by application of a force or a moment onto the electromechanically actuated arm.

The electromechanically actuated arm may have a stem pivotally disposed within the pedestal, wherein the stem is configured to pivot about a pivot axis, transitioning the arm between the closed position and the open position. The locking block may be configured to exert a force onto the stem of the arm wherein a point of contact between the locking block and the stem of the arm is offset relative to the pivot axis, thereby causing the stem of the first arm to rotate about the pivot axis, transitioning the electromechanically actuated arm into the closed position. The electromechanically actuated arm may be biased toward the open position, such that retracting of the locking block from the stem of the electromechanically actuated arm causes the arm to automatically transition into the open position.

In an embodiment of the anti-theft device, when the electromechanically actuated arm is in the open position, the article of merchandise can be removed from the tray solely in a direction parallel to the tray. At least some of the arms are configured to be extended and retracted in a plane parallel to the tray. Specifically, the stem of the electromechanically actuated arm may be configured to extend and retract relative to the tray. The adjustable arms may have teeth disposed thereon, and the anti-theft device may further include a locking member configured to selectively engage the teeth to immobilize the arms relative to the tray or to selectively disengage the teeth thereby enabling the arms to be adjusted relative to the tray. The locking member may be accessible via a port disposed on the pedestal. When the locking block is in the first position (in which the electromechanically actuated arm is opened), the access to the locking member via the port is unobstructed. However, when the locking member is in the second position (in which the electromechanically actuated arm is closed), the locking member is inaccessible via the port, whereby the locking member cannot be operated to disengage the teeth of the arms.

In an embodiment, an inductive coil is disposed underneath the tray. The inductive coil may be configured to wirelessly supply power to the article of merchandise. In this manner, the inductive coil positioned underneath the tray may be configured to detect presence of the inductive coil housed within the article of merchandise. When the inductive coil underneath the tray detects the inductive coil of the article of merchandise, the motor is automatically actuated to transition the first arm into the closed position. In an embodiment, the anti-theft device may be configured to identify a type or a model of the article of merchandise positioned on the tray. In this embodiment, the electromechanical mechanism is actuated only when the correct type/model of the article of merchandise is placed onto the tray.

Another feature of the anti-theft device is that the electric motor may be configured to cease operation responsive to detecting a force being applied to the electromechanically actuated arm while it is transitioning from the open position into the closed position. Furthermore, the anti-theft device may be configured to generate an alarm responsive to detecting a force being applied to the electromechanically actuated arm while the electromechanically actuated arm is transitioning from the open position into the closed position.

The electric motor of the electromechanical actuation mechanism may be configured to be actuated to transition the first arm into the open position responsive to receiving a wireless signal from a designated key fob for or a remote control. In an embodiment, while the electromechanically actuated arm remains in the open position, the designated remote control cannot be used to actuate another electric motor of another anti-theft device.

A photo-interrupter, proximity sensor, limit switch, or other position detection device may be used to determine whether the locking block is in the first position or in the second position. The anti-theft device may be configured to generate an alarm if the article of merchandise is removed from the tray and is not returned to the tray prior to expiration of a designated time period.

The anti-theft device may further include a light emitting device disposed within the pedestal. The light emitting device may be configured to project a light via a lens onto a designated surface. A color of the emitted light may be used to convey information pertaining to the anti-theft device.

DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiment, reference is made to the accompanying drawings, which form a part hereof, and within which specific embodiments are shown by way of illustration by which the invention may be practiced. It is to be understood that other embodiments may be utilized and structural changes may be made without departing from the scope of the invention.

Figure 1A:
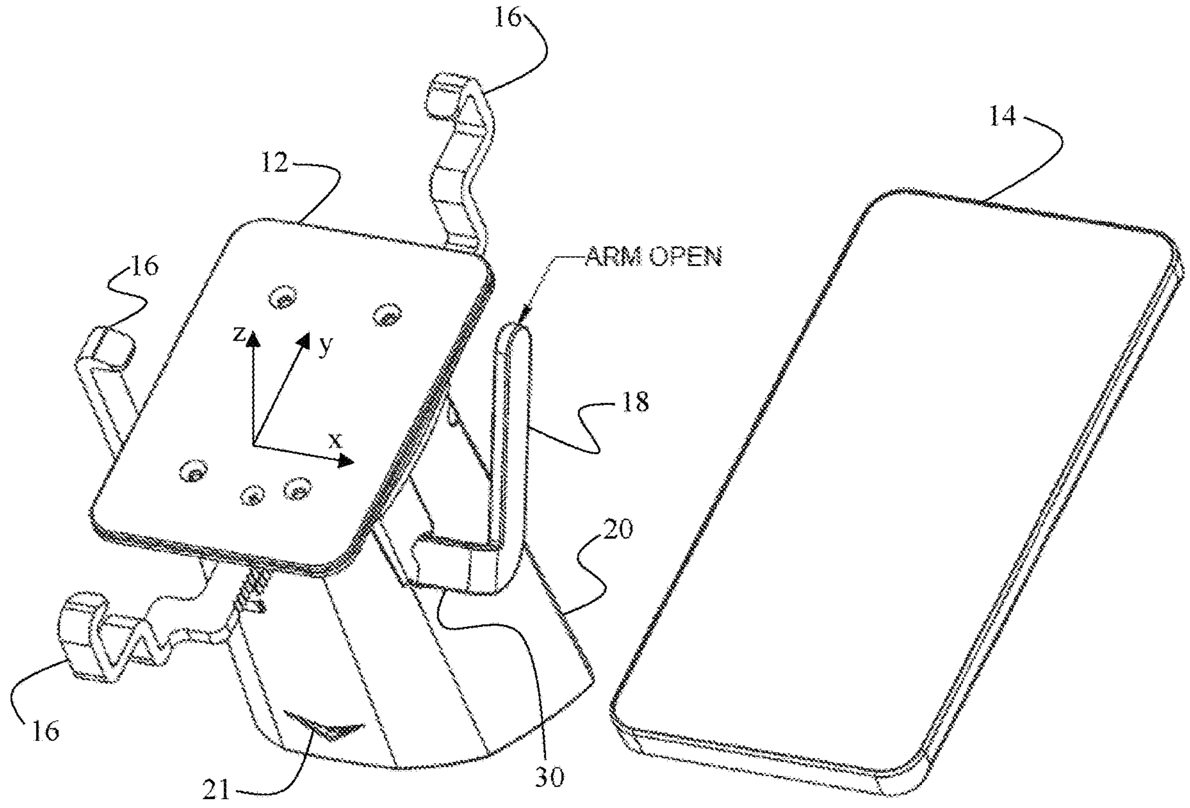
FIG. 1A is a perspective view of the anti-theft device in an unlocked configuration.
Figure 1B:
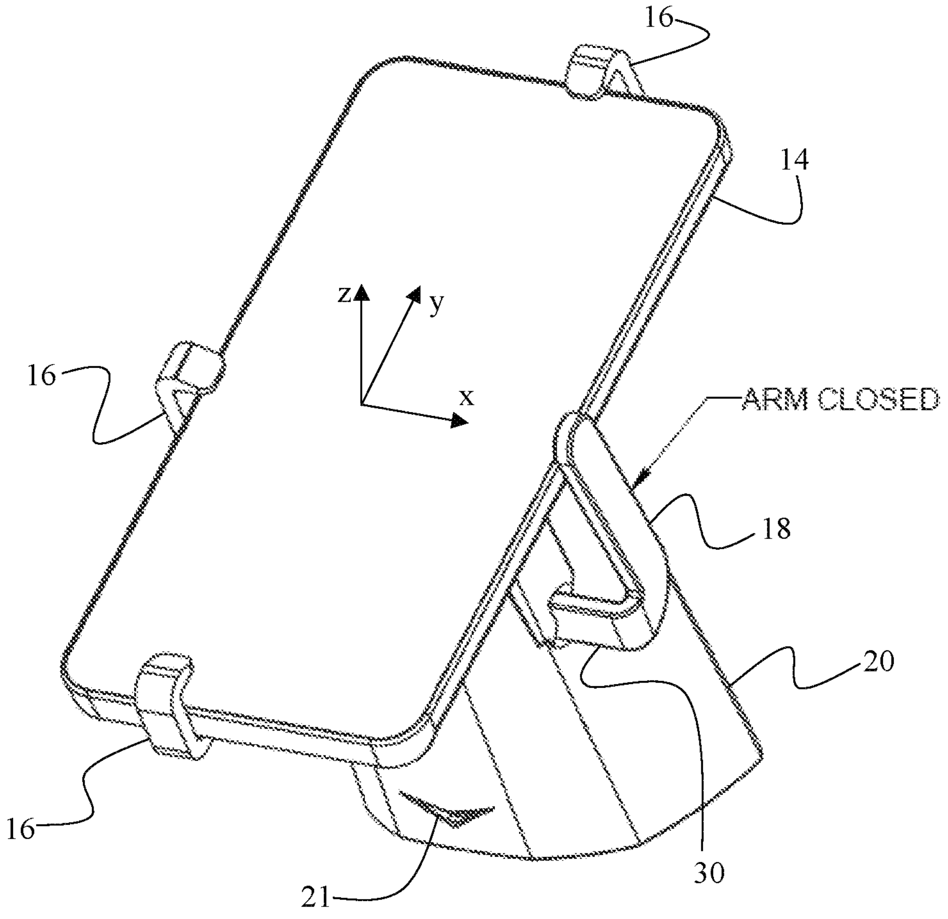
FIG. 1B is a perspective view of the anti-theft device in a locked configuration.

FIGS. 1A and 1B depict an anti-theft device 10 according to an embodiment of the invention. In this embodiment, anti-theft device 10 has a tray 12. As used herein, the term "tray" refers to a surface on which the article of merchandise 14 is positioned while secured by anti-theft device 10. In FIG. 1A, tray 12 is depicted as a surface of a separate component coupled to a pedestal 20. Alternatively, tray 12 may be a surface of pedestal 20 itself, on which article of merchandise 14 is configured to rest. The term "tray" covers both of these implementations.

Next, FIGS. 1A and 1B depict a plurality of arms configured to secure an article of merchandise to tray 12. Each arm can either be fixed, manually adjustable, or electromechanically actuated. The embodiment depicted in FIGS. 1A and 1B has three manually adjustable arms 16 and one electromechanically actuated arm 18. Manually adjustable arms 16 and electromechanically actuated arm 18 are configured to extend and retract relative to tray 12, as explained in more detail below. The number and arrangement manually adjustable arms 16 and electromechanically adjustable arms 18 can vary across various embodiments of the invention, depending on the type and dimensions of article of merchandise 14 being secured. Furthermore, some embodiments of the invention may include one or more fixed arms that do not extend and retract relative to tray 12.

FIG. 1A depicts anti-theft device 10 in its unlocked configuration. In this configuration, electromechanically actuated arm 18 is rotated away from tray 12, enabling removal of article of merchandise 14. FIG. 1A depicts electromechanically actuated arm 18 in an open position, in which electromechanically actuated arm 18 is rotated away from the plane of tray 12. In this manner, article of merchandise 14 can be removed from tray 12 by laterally sliding article of merchandise 14 out of the grips of arms 16.

FIG. 1B depicts a locked configuration of anti-theft device 10 in which article of merchandise 14 is immobilized relative to tray 12 by manually adjustable arms 16 and electromechanically actuated arm 18. In the embodiment depicted in FIGS. 1A and 1B, manually adjustable arms 16 have grips configured to receive edges of article of merchandise 14. The grips partially extend over the front surface of article of merchandise 14, thereby immobilizing article of merchandise 14 against being lifted upward (in the direction of z-axis) from tray 12. Furthermore, FIG. 1B depicts that manually adjustable arms 16 and electromechanically actuated arm 18 engage all four edges of article of merchandise 14, thereby immobilizing article of merchandise 14 against lateral movement in the x-y plane relative to tray 12.

FIGS. 1A and 1B further depict that tray 12 is coupled to or integrated into pedestal 20. Pedestal 20 is configured to be securely mounted onto a display counter in a retail store. Thus, when anti-theft device 10 is in the locked configuration, article of merchandise 14 cannot be removed from the display counter.

In an embodiment, a wireless charging device may be disposed underneath tray 12 and configured to supply power to article of merchandise 14. The wireless charging device can include one or more inductive coils configured to interact with a corresponding inductive coil housed within article of merchandise 14. One or more inductive coils can be arranged underneath tray 12 in a manner that enables wireless power transfer to articles of merchandise 14 of various geometries and having various inductive coil placements. In an embodiment, location of the inductive charging coil underneath tray 12 can be configured to be adjustable. In this manner, the inductive charging coil can be moved (either manually or automatically) into a location relative to tray 12 that corresponds to the location of an inductive charging coil within article of merchandise 14.

One aspect of anti-theft device 10 is automated transitioning from an unlocked configuration depicted in FIG. 1A into the locked configuration depicted in FIG. 1B. One method of accomplishing this is by utilizing the inductive coil positioned underneath tray 12 to detect that article of merchandise 14 has been placed onto tray 12. When the inductive coil underneath tray 12 detects presence of the inductive coil of article of merchandise 14, a processor (which may be housed underneath tray 12, within pedestal 20, or a remote location) actuates electric motor 36 (depicted in FIGS. 5A-C and 6A-C). (Other types of motors—for example, a pneumatic motor—can be used and fall within the scope of the invention). Electric motor 36 causes electromechanically actuated arm 18 to transition from the open position into the closed position. In this manner, when article of merchandise 14 is placed onto tray 12, electromechanically actuated arm 18 automatically closes to immobilize article of merchandise 14 relative to tray 12 as depicted in FIG. 1B. (The structure and functionality of the electromechanically actuation mechanism that closes and opens arm 18 is described in more detail below.)

As described above, FIG. 1B depicts that the grips of arms 16 prevent article of merchandise 14 from being lifted off tray 12 (in direction of the z-axis) and, because manually adjustable arms 16 and electromechanically actuated arm 18 engage all four edges of article of merchandise 14, article of merchandise 14 cannot be removed in a lateral direction (in direction of the x-axis and y-axis). Thus, when arm electromechanically actuated 18 is closed, article of merchandise 14 is secured within anti-theft device 10 and cannot be removed therefrom until electromechanically actuated arm 18 is transitioned into an opened position depicted in FIG. 1A.

In various embodiments of the invention, electromechanically actuated arm 18 may be actuated in various ways. For example, in some embodiments, the electromechanical mechanism responsible for transitioning electromechanically actuated arm 18 into an open position may be configured to be actuated via wireless means, such as near field communication (NFC), radio frequency identification (RFID), an optical signal (for example, infrared (IR), or the like. In this embodiment, a verified customer can be presented with a designated key fob or a remote control that is configured to transmit the predefined wireless signal to open electromechanically actuated arm 18. Once arm 18 is in the opened position (depicted in FIG. 1A), the customer can remove article of merchandise 14 from tray 12 by sliding article of merchandise 14 to the right in the x-direction. In an embodiment, electromechanically actuated arm 18 can be configured to be actuated via a wired connection to a control mechanism, which may be triggered by an authenticating system that releases the secured article, as described in more detail below.

In alternative embodiments, the electromechanical release mechanism may be actuated in response to accepting a customer's credit card, an identification card, a driver's license, or a proprietary token, card, or chip. Furthermore, the anti-theft device may be equipped with a mechanism configured to read customer's biometric information (for example, by scanning fingerprints or retina) or to require the customer to input his or her credentials. Upon registering/verifying the customer's identity, receiving a monetary security deposit, and/or verifying that the customer presents a low threat risk, the electromechanical release mechanism may be configured to automatically open electromechanically actuated arm 18, thereby releasing article of merchandise 14 and granting the trusted customer full access to article of merchandise 14.

Upon completion of the customer interaction, article of merchandise 14 can be placed back onto tray 12 by laterally sliding article of merchandise 14 into the grips of arms 16. As disclosed above, when tray 12 detects presence of article of merchandise 14—for example, by utilizing indicative charging coil—the processor of anti-theft device 10 automatically actuates electric motor 36 that closes electromechanically actuated arm 18, thereby locking article of merchandise 14 relative to tray 12.

In an embodiment, anti-theft device 10 may have a timer configured to allocate a predefined time duration for the customer interaction with article of merchandise 14. When electromechanically actuated arm 18 is opened, a timer starts and does not stop until electromechanically actuated arm 18 is closed again in response to article of merchandise 14 being placed back onto tray 12. In this manner, if article of merchandise 14 is not replaced back onto tray 12 prior to the expiration of the predefined time duration allocated for the customer interaction, an alarm may be triggered. In this embodiment, because the processor is configured to close mechanically actuated arm 18 only in response to the inductive coil of tray 12 communicating with the inductive coil of article of merchandise 14, placing a "dummy" object without an inductive coil onto tray 12 would not bypass the timer-based alarm.

Furthermore, the inductive coil (or another electronic component) underneath tray 12 may be configured to identify the model or a unique, singulated identifier of article of merchandise 14. In this embodiment, the processor will not actuate the electromechanical mechanism to close electromechanically actuated arm 18 unless the exact model of article of merchandise 14 is placed onto tray 12. In this manner, the timer-based alarm system cannot be bypassed by placing a different (perhaps less expensive) article of merchandise onto tray 12, even if that article of merchandise includes an inductive charging coil.

FIGS. 1A-B depict a light emitting diode (LED) 21 integrated into pedestal 20. LED 21 may be configured to project a light onto the display surface. The light may have different colors and/or flashing patterns to discretely communicate the status of anti-theft device 10 to the store personnel. For example, the color of the light may change upon authorization of a verified customer, upon expiration of the timer, or in response to any other event. In an embodiment, the light may be configured to illuminate through a lens and provide and enable store personnel to adjust the location where the light is directed or projected.

Figure 2:
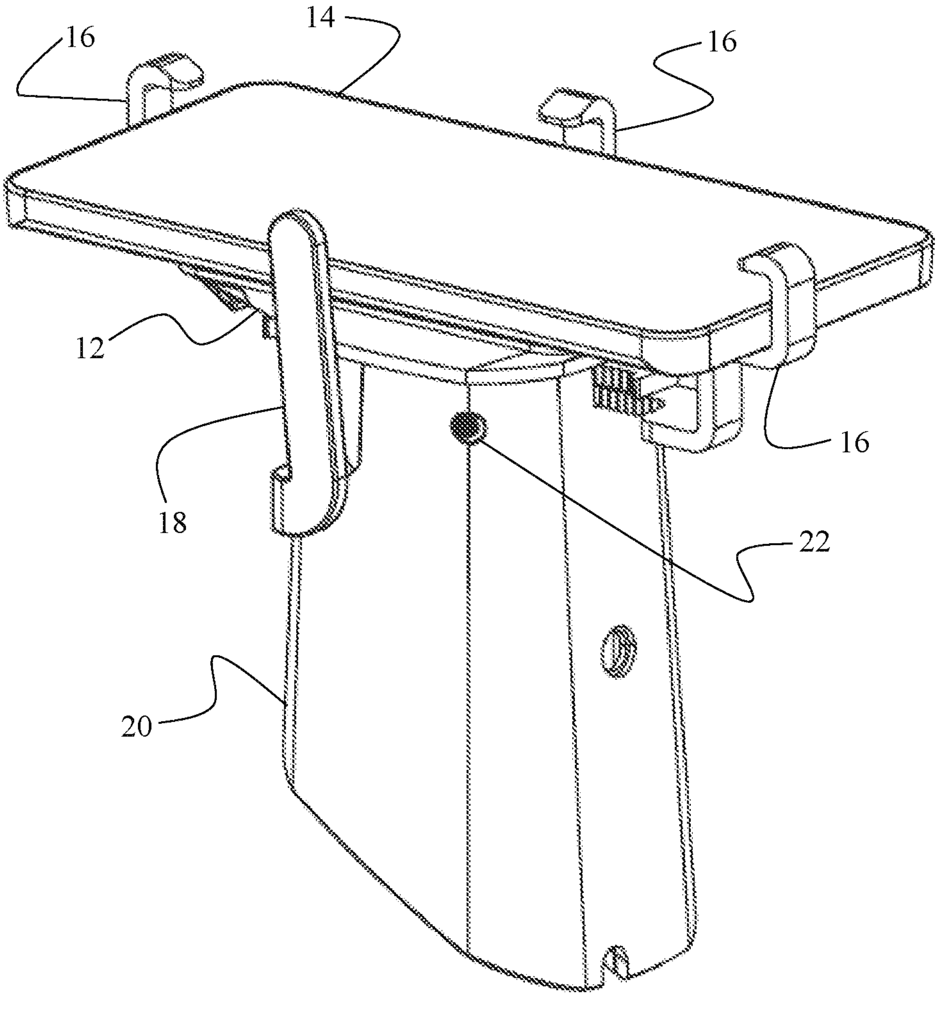
FIG. 2 is a rear-right view of an embodiment of the anti-theft device in a locked configuration.

FIG. 2 depicts anti-theft device 10 in the locked configuration from a perspective of right-back view. FIG. 2 depicts an access port 22 disposed on pedestal 20. Access port 22 provides access to a locking member 24, which is configured to selectively immobilize manually adjustable arms 16 and electromechanically actuated arm 18 against lateral adjustment relative to tray 12. As will be explained in more detail below, when electromechanically actuated arm 18 is in the open position, an authorized user can insert a tool into access port 22 to retract locking member 24 away from adjustable arms 16 and electromechanically actuated arm 18, so that arms 16 and 18 can be extended or retracted relative to tray 12. However, when electromechanically actuated arm 18 is in the closed position, the access to locking member 24 via access port 22 is blocked.

FIGS. 3A-B and 4A-B depict a locking mechanism disposed underneath tray 12 configured to selectively lock or unlock manually adjustable arms 16 and electromechanically actuated arm 18 so that arms 16 and 18 can be extended or retracted relative tray 12 in the x-y plane. One purpose of this feature is to enable retail store personnel to adjust the distances between arms 16 and 18 to accommodate dimensions of article of merchandise 14 being secured.

Figure 3A:
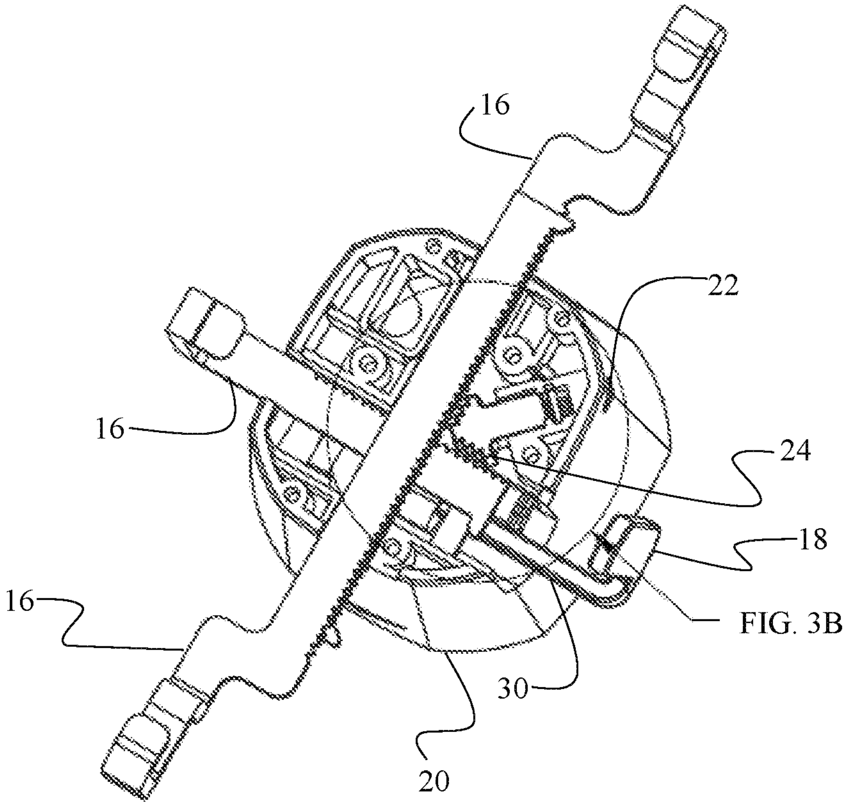
FIG. 3A is a top cross-sectional view depicting the arm-locking mechanism in an unlocked state.
Figure 3B:
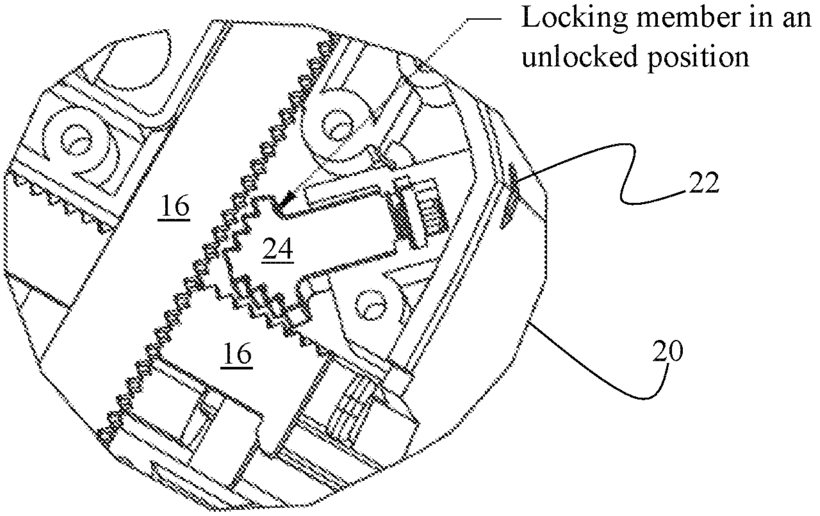
FIG. 3B is a detail view depicting the arm-locking mechanism in an unlocked state.

FIGS. 3A-B and 4A-B depict that the arm-locking mechanism includes locking member 24, which has one or more teeth configured to interlock with the teeth disposed along the stems of arms 16 and 18. FIGS. 3A-B depict locking member 24 retracted away from arms 16 and 18, such that the teeth of locking member 24 disengage the teeth of arms 16 and 18. While locking member 24 remains in this retracted position, an authorized user can extend and retract arms 16 and 18 relative to tray 12. To extend or retract arms 16 and 18 relative to tray 12, the authorized user simply applies a force to arms 16/18 to slide arms 16/18 in or out relative to tray 12. In this manner, anti-theft device 10 can be readily adapted to accommodate a wide variety of articles of merchandise 14 having different dimensions.

Figure 4A:
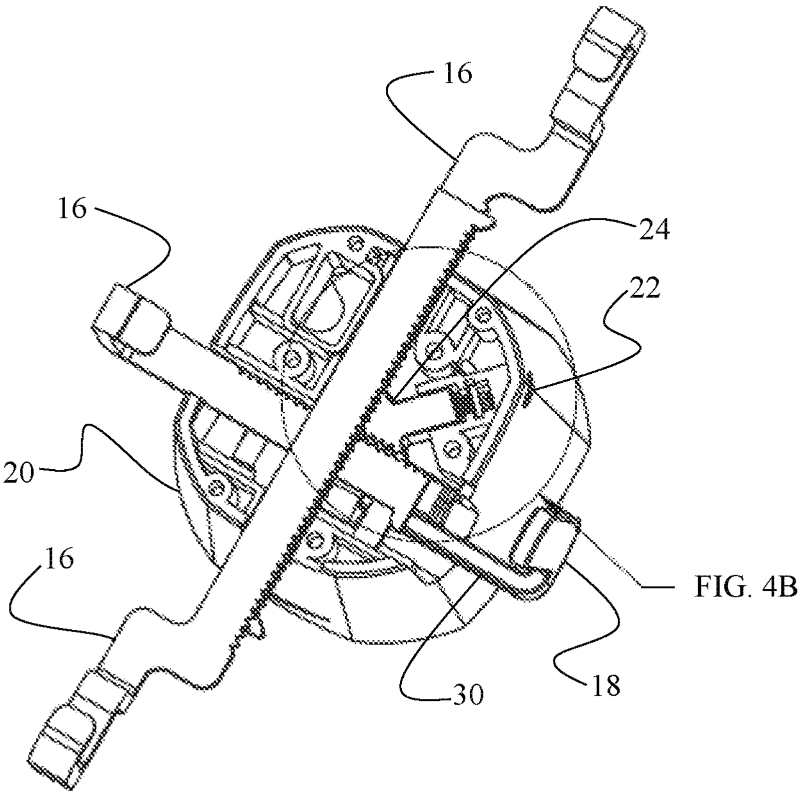
FIG. 4A is a top cross-sectional view depicting the arm-locking mechanism in a locked state.
Figure 4B:
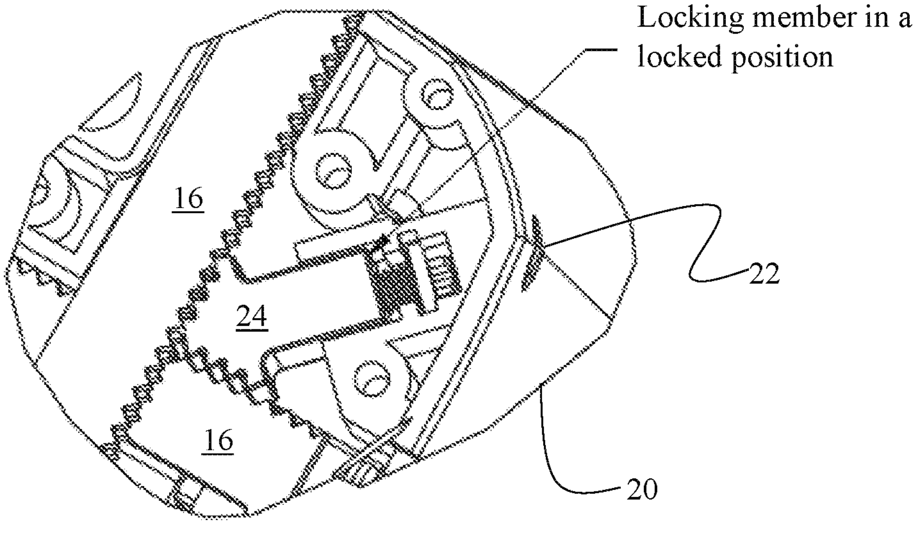
FIG. 4B is a detail view depicting the arm-locking mechanism in a locked state.

FIGS. 4A-B depict locking member 24 in a locked position, in which the teeth of locking member 24 engage the teeth of arms 16 and 18. While locking member 24 remains in this locked position, arms 16 and 18 are immobilized against movement in the x-y plane relative to tray 12. Arms 16 and 18 cannot be extended relative to tray 12 until locking member 24 is retracted away from the teeth of arms 16/18, which is the unlocked position depicted in FIGS. 3A-B. Locking member 24 may be configured to transition between locked and retracted positions in several ways, including using a screw-threaded actuator, an electromagnet (such as a solenoid), an electrical motor, a mechanical push button, etc. In an embodiment, the locking component may be biased toward the locked configuration.

As an added security measure, to retract locking member 24 away from arms 16 and 18, the user must access locking member 24 via access port 22. When electromechanically actuated arm 18 is in the closed position, access to locking member 24 is blocked, preventing access to locking member 24. In this manner, arms 16 and 18 cannot be extended or retracted relative to tray 12 unless electromechanically actuated arm 18 is in the open position. Thus, when anti-theft device 10 is in the locked configuration, arms 16 and 18 are immobilized relative to tray 12 and cannot be unlocked without operating the electromechanical mechanism that opens electromechanically actuated arm 18, as described in more detail below.

Figure 5A:
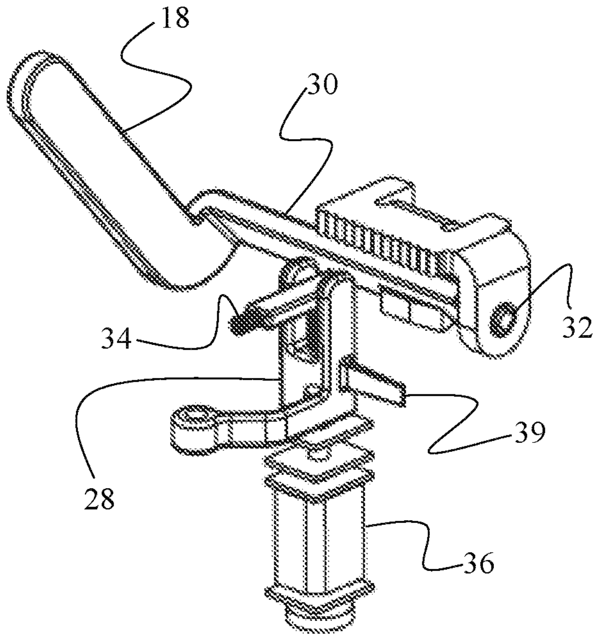
FIG. 5A is a perspective view of the electromechanical release mechanism with the electromechanically actuated arm in the open position.
Figure 5B:
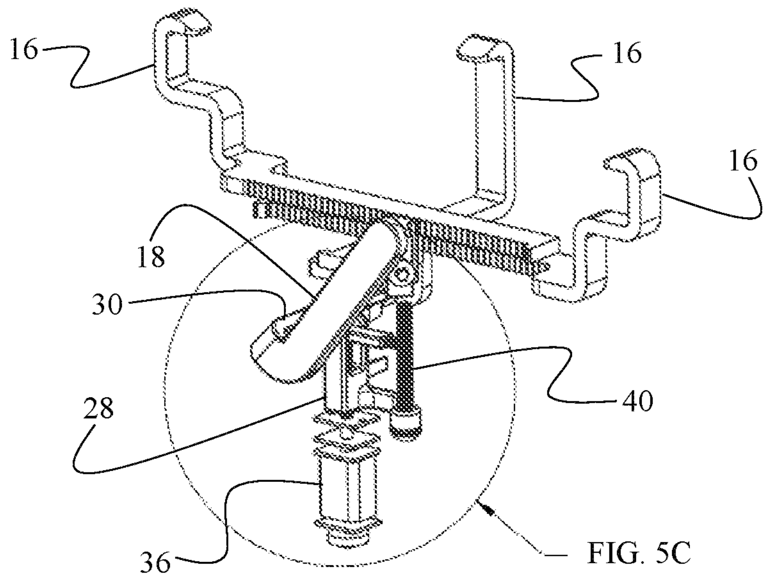
FIG. 5B is a perspective view depicting the mechanically adjustable arms and the electromechanical release mechanism with the electromechanically actuated arm in the open position.
Figure 5C:
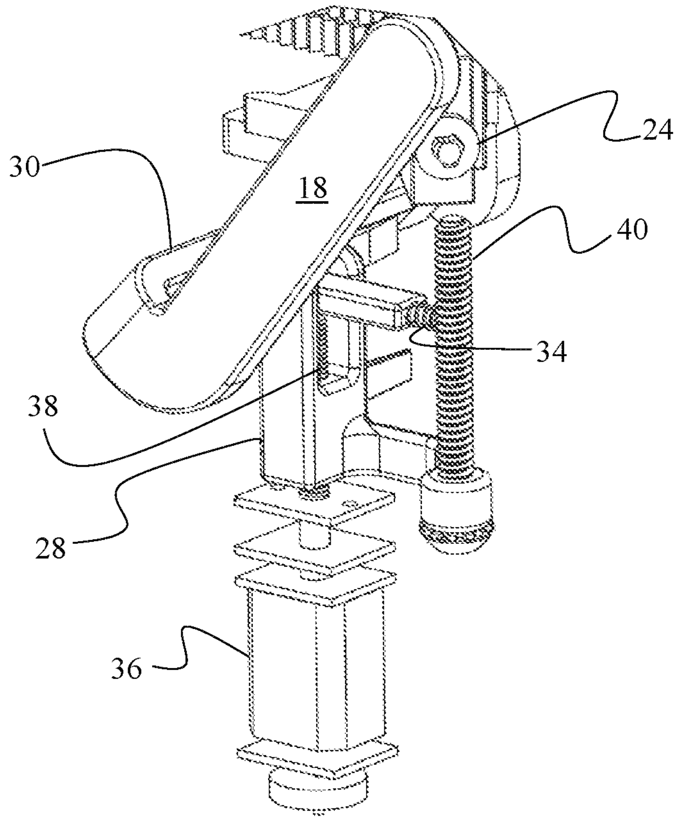
FIG. 5C is a detail view of the electromechanical release mechanism with the electromechanically actuated arm in the open position.
Figure 6A:
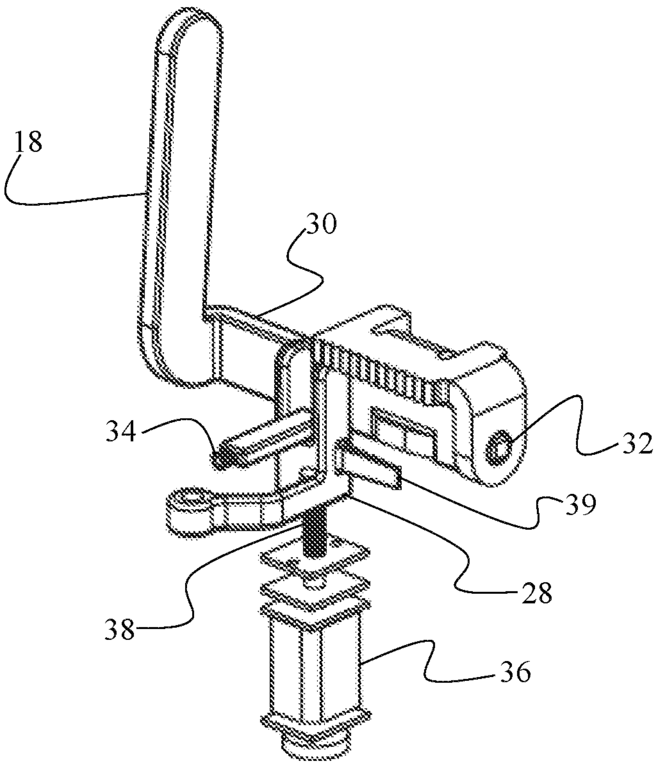
FIG. 6A is a perspective view of the electromechanical release mechanism with the electromechanically actuated arm in the closed position.
Figure 6B:
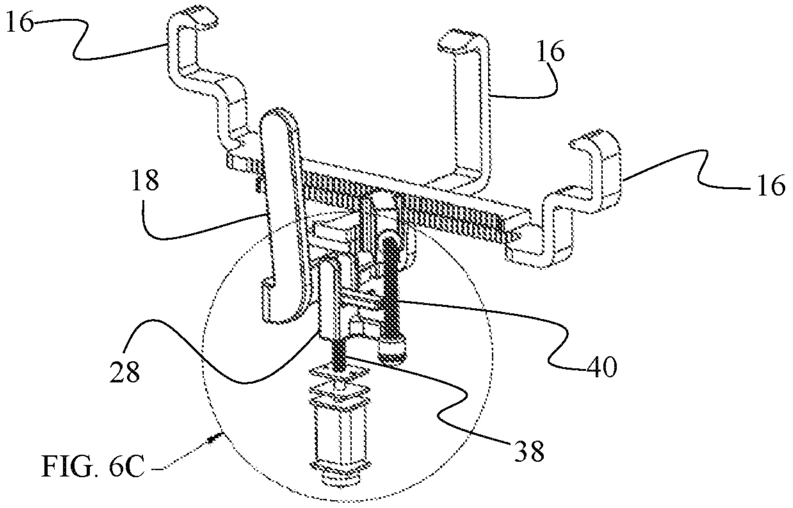
FIG. 6B is a perspective view depicting the mechanically adjustable arms and the electromechanical release mechanism with the electromechanically actuated arm in the closed position.
Figure 6C:
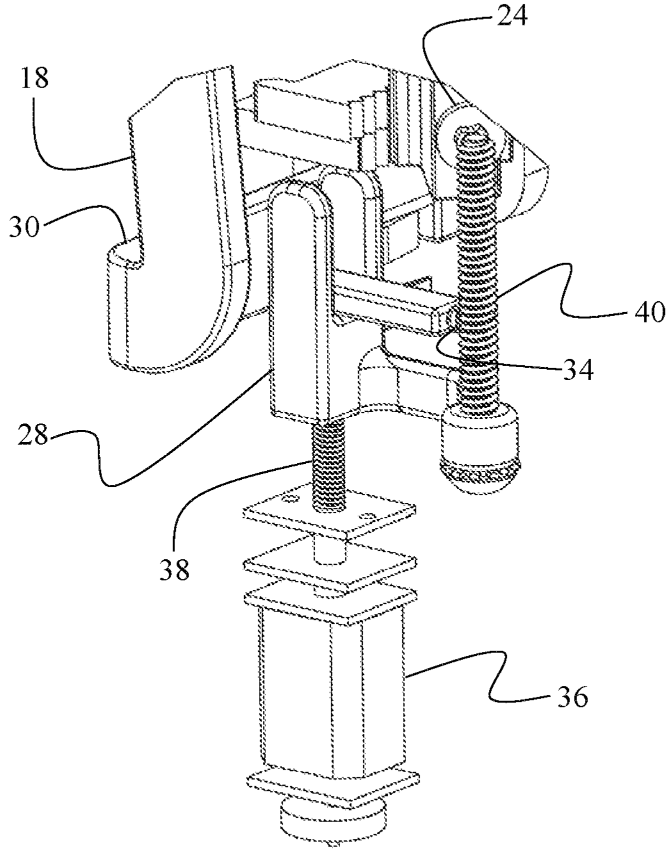
FIG. 6C is a detail view of the electromechanical release mechanism with the electromechanically actuated arm in the closed position.

Next, FIGS. 5A-C and 6A-C depict an exemplary embodiment of the electromechanical mechanism that opens and closes electromechanically actuated arm 18. FIGS. 5A-C depict electromechanically actuated arm 18 in an open position, in which the electromechanically actuated arm 18 is rotated away from the plane in which article of merchandise 14 is positioned on tray 12. FIGS. 6A-C depict electromechanically actuated arm 18 in a closed position, in which the electromechanically actuated arm 18 intersects the plane in which article of merchandise 14 resides on tray 12 and, therefore, when closed, electromechanically actuated arm 18 impedes removal of article of merchandise 14 from tray 12.

FIGS. 5A and 6A depict that electromechanically actuated arm 18 has a stem 30, which is configured to rotate about a pivot axis 32. Next, FIGS. 5B-C and 6B-C depict a locking block 28 configured to translate vertically within pedestal 20. Specifically, FIGS. 5B-C depict that, when locking block 28 is lowered, electromechanically actuated arm 18 is in the open position, while FIGS. 6B-C depicts that, when locking block 28 is raised, electromechanically actuated arm 18 is in the closed position.

FIGS. 5B and 5C depict that, when locking block 28 is lowered, locking block 28 disengages stem 30 of arm 18. FIGS. 5B and 5C also show that a biasing element 34 exerts a force onto stem 30 of arm 18, wherein the force is offset from pivot axis 32. Thus, the biasing force creates a moment causing stem 30 to rotate about pivot axis 32, transitioning arm 18 into the open position depicted in FIGS. 5B and 5C. As discussed above, in this open position, arm 18 does not intersect the plane in which article of merchandise 14 is positioned on tray 12 and, therefore, arm 18 no longer restraints article of merchandise 14 against lateral movement in the x-axis direction relative to tray 12. Thus, an authorized user (a retail employee or a verified customer) can slide article of merchandise 14 laterally out of the grips of arms 16 to remove article of merchandise 14 from anti-theft device 10 for a customer interaction.

As explained above, when article of merchandise 14 is replaced back onto tray 12, inductive coil underneath tray 12 detects presence of the inductive coil of article of merchandise 14. In response to detecting the inductive coil of article of merchandise 14, an electrical signal is transmitted to the processor (which may be housed underneath tray 12, within pedestal 20, or a remote location). Upon receipt of this signal, the processor actuates electric motor 36 to raise locking block 28, closing arm 18.

FIGS. 5B-C and 6B-C depict that electric motor 36 is screw-threadedly connected to locking block 28 via a driving screw 38. In an embodiment, electric motor 36 may be a worm gear motor. When actuated, electric motor 36 causes driving screw 38 to rotate, which causes locking block 28 to rise. Locking block 28 may have a finger 39 configured to translate up and down within a corresponding groove disposed within pedestal 20. In this manner, finger 39 restricts locking block 28 against rotation relative to pedestal 20 and, thus, locking block 28 can only move up or down. Thus, when the presence of article of merchandise 14 on tray 12 is detected, electric motor 36 rotates driving screw 38, causing locking block 28 to move upward and engage stem 30 of arm 18. The point of engagement between locking block 38 and stem 30 is offset relative to pivot axis 32, thereby creating a moment on stem 30, urging arm 18 to rotate into the closed position. The force exerted onto stem 30 by locking member 28 is greater than the force exerted onto stem 30 by biasing member 34. Accordingly, as locking block 28 rises, stem 30 rotates about pivot axis 32. In this manner, as locking block 28 rises, arm 18 is transitioned into the closed position.

Another feature of anti-theft device 10 depicted in FIGS. 5B-C and 6B-C pertains to a blocking screw 40, which is screw-threadedly coupled to locking block 28. When locking block 28 is raised, blocking screw 40 aligns with access port 22 and blocks access to locking member 24. When locking block 28 is lowered, blocking screw 40 is retracted away from access port 22, enabling an authorized user to access locking member 24 by inserting a tool into access port 22. In this manner, blocking screw 40 ensures that locking member 24 can be accessed only when locking block 28 is lowered and electromechanically actuated arm 18 is in the opened position, thus creating an additional layer of security.

Another feature of anti-theft device 10 pertains to an ability to remove article of merchandise 14 by an authorized user in case electric motor 36 malfunctions or there is a power outage. If such event were to occur, pedestal 20 can be unmounted from the display surface, revealing access to the head of blocking screw 40. At this point, the authorized user can use a tool—for example, a screwdriver—to manually retract blocking screw 40 away from access port 22. After blocking screw 40 has been sufficiently retracted from access port 22, the user can access and operate locking member 24 to retract its teeth away from the teeth of arms 16 and 18, as depicted in FIGS. 3A-B. With locking member 24 in the retracted position, the user can extend arms 16 and 18 relative to tray 12, releasing article of merchandise 14.

In an embodiment, the processor may be configured to detect the rate of rotation of driving screw 38 (pulse counting). If an obstacle interferes with arm 18 as it is being transitioned into the closed position, the rate of rotation of driving screw 38—and, hence, electric motor 36—will decrease. Upon detecting the decreased rate of rotation, the processor may be configured to stop electric motor 36, electric motor 36 can be reversed, and/or an alarm may be produced. This feature has a two-fold benefit: (1) safety: if a user's finger or clothing gets caught between tray 12 and arm 18, shutting off electric motor 30 would prevent a potential injury; and (2) security, if someone interferes with normal operation of arm 18, anti-theft device 10 will alert the store personnel.

Upon completion of the customer interaction, article of merchandise 14 must be placed back into anti-theft device 10 by laterally sliding article of merchandise 14 into the grips of arms 16. When article of merchandise 14 is properly placed onto tray 12, the inductive coil of tray 12 will detect inductive coil of article of merchandise 14, thereby automatically actuating electric motor 36 to raise locking block 28 and to transition electromechanically actuated arm 18 into the closed position.

An advantage of using the electromechanical mechanism described above is that, because pivot axis 32 of stem 30 is not aligned with the axis of rotation of electric motor 36, the worm-gear engagement between electric motor 36 and electromechanically actuated arm 18 ensures that arm 18 cannot be opened using manual force. Furthermore, preferably, electromechanically actuated arm 18 is made of a metal or a metal alloy and, therefore, is not susceptible to being broken or deformed using manual force or basic manual tools. Thus, because arm 18 cannot be forced into the open position and cannot be broken or bent, article of merchandise 14 cannot be removed from tray 12 without operating the electromechanical mechanism, ensuring high level of anti-theft security.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

What is claimed is:

1. An anti-theft device for securing an article of merchandise, comprising:

a pedestal affixed to a support surface;

an electromechanically operated arm configured to selectively immobilize the article of merchandise relative to the pedestal, wherein the electromechanically operated arm has a closed position in which the article of merchandise is immobilized relative to the pedestal and an open position in which the article of merchandise can be removed from the pedestal;

a locking block movingly disposed within the pedestal, wherein the locking block has a first position relative to the pedestal in which the locking block is configured to immobilize the electromechanically operated arm in the closed position, and wherein the locking block has a second position relative to the pedestal in which the locking block is configured to release the electromechanically operated arm, enabling the electromechanically operated arm to transition into the open position, an electrical actuator operatively connected to a locking block which is operatively engaged with the electromechanically operated arm, wherein the locking block is configured to move between the first position and the second position under an influence of a force produced by the electrical actuator thereby selectively closing or opening the electromechanically operated arm, wherein in the closed position the electromechanically operated arm is restricted from being transitioned into the open position via application of a manual force or moment thereto; and a processor in electrical communication with the electrical actuator, wherein in response to a designated signal, the processor is configured to energize the electrical actuator causing the electromechanically operated arm to move from the closed position into the open position thereby releasing the article of merchandise for removal from the pedestal.

2. The anti-theft device of claim 1, wherein the electromechanically operated arm is configured to rotate about a pivot axis.

3. The anti-theft device of claim 2, wherein the locking block is configured to translate in a plane substantially perpendicular to the pivot axis.

4. The anti-theft device of claim 1, further comprising a plurality of arms configured to extend and retract relative to the pedestal.

5. The anti-theft device of claim 4, wherein the plurality of arms is configured to restrict the article of merchandise to linear movement solely in a direction of the electromechanically operated arm.

6. The anti-theft device of claim 4, wherein at least some of the plurality of arms have teeth disposed thereon, and wherein a locking member is configured to selectively engage the teeth thereby immobilizing the plurality of arms relative to the pedestal or to selectively disengage the teeth thereby enabling the plurality of arms to be extended relative to the pedestal.

7. The anti-theft device of claim 6, wherein the locking member is operable via a port disposed on the pedestal, and wherein the port is occluded when the electromechanically operated arm is in the closed position thereby precluding operation of the locking member.

8. The anti-theft device of claim 1, wherein the anti-theft device is configured to generate an alarm responsive to detecting an obstacle obstructing the electromechanically operated arm during operation thereof.

9. The anti-theft device of claim 1, wherein the processor is configured to deactivate the electrical actuator responsive to detecting an obstacle obstructing the electromechanically operated arm during operation thereof.

10. The anti-theft device of claim 1, wherein the designated signal is transmitted wirelessly.

11. The anti-theft device of claim 1, wherein the designated signal is transmitted using a near field communication (NFC), a radio frequency (RF), or an optical signal.

12. The anti-theft device of claim 1, wherein the designated signal is transmitted responsive to receiving data associated with a credit card, an identification card, a driver's license, a token, a proprietary card, a chip, biometric information, or an input of user credentials.

13. A method of securing an article of merchandise against theft, comprising:

mounting a pedestal to a support surface, wherein an electromechanically operated arm is pivotally disposed relative to the pedestal and has a closed position in which the electromechanically operated arm immobilizes the article of merchandise relative to the pedestal and an open position in which the electromechanically operated arm is pivoted away from the article of merchandise thereby enabling removal thereof from the pedestal;

placing the article of merchandise onto the pedestal while the electromechanically operated arm is in the open position;

transitioning the electromechanically operated arm into the closed position, wherein the electromechanically operated arm is restricted by a locking block from being transitioned back into the open position via a manual force or moment applied thereto, wherein the locking block is movingly disposed within the pedestal and has a first position relative to the pedestal in which the locking block immobilizes the electromechanically operated arm in the closed position, and wherein the locking block has a second position relative to the pedestal in which the locking block releases the electromechanically operated arm, enabling the electromechanically operated arm to transition into the open position; and transmitting a designated signal responsive to which a processor is configured to energize an electrical actuator operatively connected to the locking block, wherein the electromechanically operated arm is configured to move from the closed position into the open position in response to the locking block being transitioned into the second position under an influence of a force produced by the electrical actuator, thereby releasing the article of merchandise for removal from the pedestal.

14. The method of claim 13, wherein the designated signal is transmitted wirelessly.

15. The method of claim 14, wherein the designated signal is transmitted using a near field communication (NFC), a radio frequency (RF), or an optical signal.

16. The method of claim 13, wherein the electromechanically operated arm is configured to rotate about a pivot axis, and wherein the locking block is configured to translate in a plane substantially perpendicular to the pivot axis.

17. The anti-theft device of claim 1, further comprising an electronic circuitry disposed within the pedestal configured to detect that the article of merchandise has been placed onto the pedestal.

18. The anti-theft device of claim 17, wherein the electronic circuitry comprises a first inductive coil configured to detect a second inductive coil disposed within the article of merchandise.

19. The method of claim 13, wherein the pedestal comprises an electronic circuitry configured to detect that the article of merchandise has been placed onto the pedestal.

20. The anti-theft device of claim 19, wherein the electronic circuitry comprises a first inductive coil configured to detect a second inductive coil disposed within the article of merchandise.

* * * * *